Nov. 24, 1942.  C. V. SMITH  2,302,917
METHOD AND APPARATUS FOR MAKING FLAT OPTICAL SURFACES
Filed Sept. 12, 1940
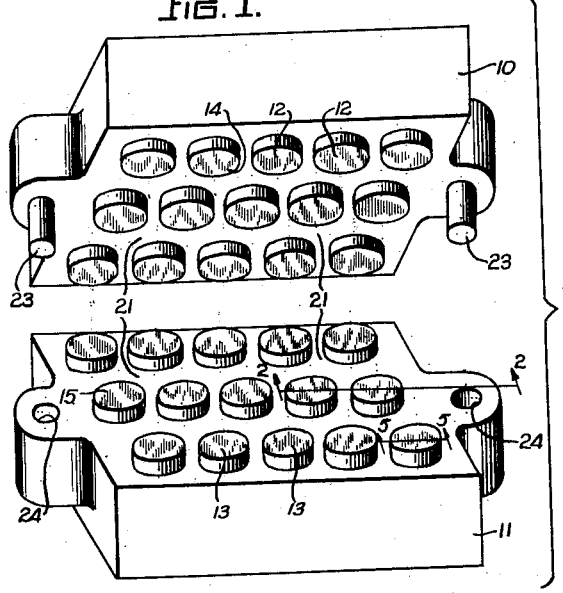
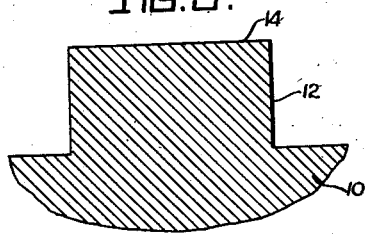
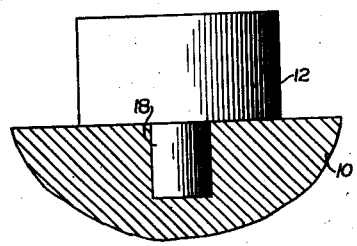
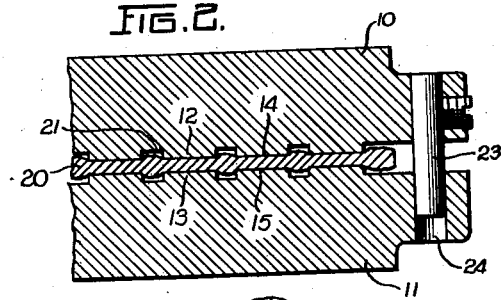
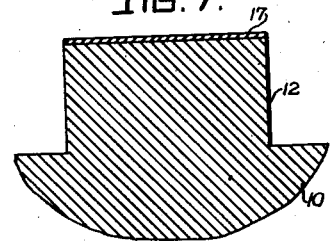
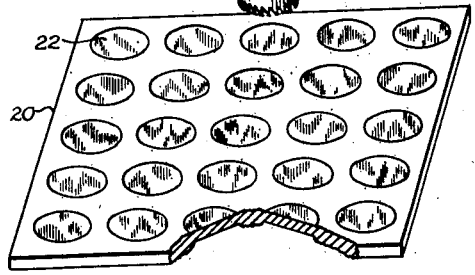
Inventor
CHARLES V. SMITH Patented Nov. 24, 1942

2,302,917

UNITED STATES PATENT OFFICE 2,302,917

METHOD AND APPARATUS FOR MAKING FLAT OPTICAL SURFACES

Charles V. Smith, Dayton, Ohio, assignor to The Univis Lens Company, Dayton, Ohio, a corporation of Ohio Application September 12, 1940, Serial No. 356,522

3 Claims. (Cl. 18—42)

This invention relates to a method and apparatus for producing flat optical planos from unbreakable materials, such as synthetic resin.

This invention particularly relates to a production method for producing optical planos from synthetic resins at a relatively low cost per unit, the arrangement being such that a plurality of planos can be formed simultaneously.

There are many places wherein the use of planos are desirable and, particularly, planos having good optical properties can be used advantageously in camera filters, mirrors, various type sun glasses, and other optical uses. When producing flat planos for optical use, it is desirable that the optical properties of the synthetic resin from which the plano is being formed shall not be changed. The retention of good optical properties in a plano is just as important as the retention of the optical properties in a lens.

It is therefore an object of my invention to provide a method for producing flat optical planos of high optical quality at relatively low cost.

It is another object of the invention to produce a plurality of flat optical planos simultaneously in a single operation.

It is another object of the invention to produce a plurality of optical planos upon a sheet of synthetic resin by spot surfacing areas of the resin to a high optical finish.

It is another object of the invention to spot surface diametrically opposed faces of a sheet of resinous material by a single operation.

It is another object of the invention to provide opposed surfaces having spot finished areas of optical perfection which are arranged to press upon a sheet of synthetic material for a sufficient length of time that the finished surface of the spot areas are transferred to spot areas upon the sheet of resinous material.

It is another object of the invention to provide a method for producing a plurality of flat optical planos in a sheet of resinous material and to subsequently remove the planos from the sheet.

It is another object of the invention to provide an apparatus for spot surfacing a sheet of resinous material to produce optical planos.

It is another object of the invention to provide a pair of dies having a plurality of spot areas finished to a high optical perfection, which dies are arranged in a manner so that the spot areas are diametrically opposed so that when pressed upon a sheet of resinous material the sheet will have a plurality of spot areas finished thereon having surfaces of equal perfection to the surfaces of the die.

It is another object of the invention to arrange a plurality of spot finished surfaces upon a pair of dies, which are arranged in a common plane.

It is another object of the invention to provide a pair of dies for forming optical planos each of which have a plurality of optically finished spot surfaces which are adapted to be arranged in diametric opposition, and which surfaces upon each of the dies are arranged in a common plane, and are maintained in parallel planar alignment while engaging a sheet of resinous material positioned therebetween.

It is another object of the invention to provide a method for simultaneously producing a plurality of flat optical planos of determined thickness.

It is still another object of the invention to produce a plurality of flat optical planos by causing a plurality of optically finished planar surfaces to be pressed into a sheet of resinous material to produce optically finished spot surfaces thereon.

It is another object of the invention to provide a method for producing a plano by pressing parallel plane surfaces upon a mass of resinous material and permitting unconfined lateral expansion of the mass.

It is another object of the invention to provide a method for producing a plano by pressing parallel plane surfaces upon a mass of resinous material whereby the mass is caused to flow laterally between the plane surfaces into an unconfined area around the edge periphery of the forming surfaces.

It is still another object of the invention to provide a method to produce a plurality of flat planos concomitantly by compressing a mass of resinous material between a plurality of parallel plane surfaces, and permitting the mass compressed between the plane surfaces to expand or flow laterally into unconfined areas around the periphery of the forming surfaces.

Further objects and advantages will be apparent from the description and the drawing.

In the drawing:

Figure 1 is a perspective elevational view of a pair of die elements for practicing the teachings of this invention;

Figure 2 is a partial cross-sectional view of the die elements of Figure 1 taken substantially along line 2—2 of Figure 1;

Figure 3 is a perspective elevational view, partially in cross-section, of a sheet of material having planos produced thereupon, and shows a device for removing the planos from the sheet;

Figure 4 is a perspective elevational view of a flat plano produced by the teachings of this invention;

Figure 5 is a cross-sectional view of one of the die elements of Figure 1 taken substantially along the line 5—5 of Figure 1;

Figure 6 is an elevational view of a die element, showing the manner in which the element can be removed, and be positioned within a die carrying member;

Figure 7 is a cross-sectional view of a die element substantially the same as that of Figure 5, except that the face of the die element of Figure 7 has had a hard face electrodeposited thereon.

In this invention I desire to provide a method for inexpensively producing planos of high optical quality from resinous material, and to produce the planos in a manner whereby a multiplicity thereof can be formed at the same time, thereby reducing the number of operations required and the expense of the individual unit. In the arrangement of my method for producing optical planos, I desire to provide a pair of die elements whereon a plurality of spots, of the proper area, have been finished to a surface of high optical perfection. The so finished surfaces upon the faces of the pair of die elements are arranged so that when the die elements are in opposed relation the finished surfaces will be diametrically opposite each other. A sheet of resinous material can then be placed between the surfaces of the die elements and pressure be applied upon the die elements to bring the finished surfaces into engagement with the surfaces of the sheet of resinous material. Application of pressure upon the die elements will cause the sheet to be compressed between the spot surfaced areas whereby the material is caused to flow or expand laterally from between the spot areas into unconfined areas around the periphery of the spot areas. The pressure is permitted to be exerted upon the die elements for a sufficient length of time that the finished surfaces of the dies will be imparted upon spot areas of the sheet of resinous material, the material moved by the forming of the plano surfaces flowing into the unconfined areas. The duration of time over which this transposition of surface occurs may be shortened by heating the sheet of resinous material and the dies to a temperature somewhat above normal room temperature. After the surface finish has been imparted to the spot areas upon the sheet of material, the material may then be caused to be set, such as by cooling, if the sheet has been elevated in temperature.

Upon the sheet becoming set the dies may be opened and the sheet removed, whereupon any suitable device can be used to remove the finished spot areas from the sheet of material. By the arrangement of this method, I provide a means for producing a plurality of planos simultaneously and thereby insure that all of the planos will be of equal optical perfection and of the same thickness.

To practice my invention I provide a pair of die elements 10 and 11. These die elements are provided with a plurality of raised surfaces 12 and 13 respectively. In the apparatus, as described in this invention, the dies 10 and 11 are particularly adapted for the production of flat optical planos which are circular in shape. Therefore, the subsequent description will be directed to the specific form of planos produced by the device disclosed in this invention, but I do not intend the specific description of a specific device to limit my application to that particular form of device, but rather I intend that all planos, and particularly all flat planos of any shape, can be produced by the teachings of my invention.

The raised surfaces 12 and 13 are in the shape of cylindrical protrusions, and are equidistantly spaced over the face area of the respective die elements 10 and 11. The equidistant spacing of the forming surfaces 12 and 13 over the respective die faces 10 and 11 provide areas between adjacent forming cylinders 12 and 13 in which the resinous material, from a sheet positioned therebetween, can flow when the die members 10 and 11 are pressed together.

The faces 14 and 15 of the forming cylinders 12 and 13 are finished to a high degree of optical perfection. These faces may be finished in any one of several different ways, one of which is to suitably grind and polish the metal surface of the forming cylinder 12, or 13. Under certain conditions it may be desirable that the surfaces 14 and 15 of the forming cylinders 12 and 13 shall be made of glass, which glass surface can be caused to adhere to the forming cylinders 12 and 13 in any suitable manner, or may be a loosely positioned insert for the face 14. Also, to provide the desired optical finish upon the faces 14 and 15, it is permissible to plate a relatively hard surface material upon the faces of the forming cylinders 12 and 13, as indicated at 17 (see Figure 7). Such material as chromium has shown particularly desirable properties for electrodepositing upon the optical finishing surfaces of the forming cylinders. In any event, it is required that the faces 14 and 15 shall be of sufficient optical perfection that they will impart a surface finish to a sheet of resinous material which is of sufficiently high perfection to permit the same to be used for optical purposes.

When making the dies 10 and 11, the forming cylinders 12 and 13 may be cut from the main body of the die material, whereby the forming cylinders 12 and 13 form an integral part of the body of the die 10, or 11, as disclosed in Figures 5 and 7. If desired, each of the individual forming cylinders 12 and 13 may be arranged as inserts for the main body of the dies 10 or 11, in which instance the forming cylinder 12, or 13, will be provided with an extending shaft 18 which may protrude into a hole provided in the face surface of the die 10, or the die 11. After the dies 10 and 11 have been prepared with a suitable number of forming cylinders 12 or 13 thereupon, the surface of the cylinders 12 or 13 are prepared simultaneously as a group. That is, the group of forming cylinders 12 will all be ground and polished to the desired optical perfection upon one setting of the die 10 within the finishing machine. This arrangement permits all of the faces 14 of the forming cylinders 12 to be ground and polished to a common plane. The same operation will be performed upon the faces 15 of the forming cylinders 13. It is thus seen that all of the spot faces 14 and 15 are finished in like manner so that when the dies 10 and 11 are brought into opposed relation the surface planes of the plurality of surfaces 15 and 14 will be parallel planes.

To produce a flat optical plano from such parallel plane surfaces a sheet of resinous material 20 is positioned between the die elements 10 and 11. The dies 10 and 11 are, of course, positioned within a suitable press for providing pressure upon the dies and thus tending to compress the sheet of resinous material positioned therebetween. The pressure can be retained upon the dies 10 and 11 for a sufficient period of time to cause the faces 14 and 15 of the forming cylinders 12 and 13 to spot finish diametrically opposed faces of the sheet of resinous material. Since all of the faces 14 and 15 are in parallel planes, it may be seen that the spot facing of the surface of the resinous sheet will be such that all of the spot finished areas will be of the same thickness.

When the dies 10 and 11 are brought into engagement with the opposite faces of the sheet of resinous material 20, the open areas 21 provided between the plurality of forming cylinders 12 and 13, will provide means to permit a flow of the material of the sheet outwardly from the finishing areas, whereby crowding of the finishing area is prevented, as could normally be expected if the entire sheet of resinous material was attempted to be finished to optical perfection over its entire area. There is of necessity a certain amount of compression upon the sheet of resinous material 20 to provide the finishing surfaces of optical perfection upon the spot areas which form the planos. When the sheet is compressed by the die surfaces the material therebetween will expand or flow outwardly into the unconfined areas around the periphery of the forming surface.

This flow of material from between the plano forming areas relieves the compression of the material therebetween and prevents crowding of the material within the mass of the sheet. The relief of the crowding prevents the production of undue strain in the resinous material and, thereby, prevents the introduction of "optical strain" into the planos while being produced, or formed. This optical strain is a variety of strain which impairs the optical properties of resinous material, particularly resulting in a displacement of the optical paths through the material, resulting in by-refringence. Thus, the provision of a surface finish of high optical perfection is only one of the requirements for producing a plano of high optical quality, particularly when working with resinous material. The movement of the mass of the resin cannot be such as to produce internal strain, which strain can either be produced by forcing the material to move at too great a rate, or crowding of the material within the internal mass of the sheet of resin. To relieve the latter, I provide the cut away areas 21, while to prevent the former the rate at which the pressure is applied upon the sheet of resin must be controlled.

I have found that the rate at which resinous materials can be formed without the production of optical strain is a determined rate, and which rate of deformation can be determined for each resinous material, and for the temperature at which the material is to be worked. There cannot be set forth a specific rate of formation, since the composition of resinous materials is quite variable and thus change the specific rate of deformation at which the material can be worked in accordance with governing temperatures.

Thus, to produce flat planos of high optical quality, it is required that the surface finish be as near to perfection as possible and that the optical properties of the resinous material shall not have been changed. The first I produce by surface finishing the faces 14 and 15 of the forming cylinders 12 and 13 to as high degree of optical perfection as is practical, whereby the finish of the surface 14 or 15 will be imparted to a plano, such as the plano 22, see Figure 4. I prevent the change of optical properties by controlling the rate of mass movement of the material and by the prevention of the internal crowding of the mass.

When forming a plurality of flat planos upon a sheet of resinous material it is essential that the planes of the surfaces 14 and 15 be retained parallel. For this reason I provide a pair of pins 23 in the die member 10. These pins are adapted to extend into the holes 24 provided in the die member 11, and are a relatively close fit therewith so that the parallel alignment of the planes of the surfaces 14 and 15 are retained throughout the forming operation when compressing the sheet of resin between the die members 10 and 11.

After the sheet of resinous material has been between the die faces 14 and 15 for a sufficient length of time the surface finish of the faces 14 and 15 will be imparted to spot surfaces upon the sheet 20. The sheet 20 can then be removed from between the dies 10 and 11 and the optical planos 22 be removed from the sheet by means of a suitable circular cutting device 25.

I have not heretofore specifically mentioned that either the sheet 20 or the dies 10 and 11 could be heated or cooled. However, since the resinous material from which optical planos are made is relatively hard, the duration of the forming process can be lessened if the sheet 20 and the dies 10 and 11 are heated by suitable means. This heating may take the form of either a fluid circulating through the dies, or electrical resistance may be provided therein. The temperature elevation of the dies 10 and 11, by suitable means, will elevate the temperature of the sheet 20 to permit a more rapid formation of the spot surfaces thereof. When the temperature of the sheet 20 has been elevated considerably above normal room temperature the sheet would tend to restore itself to the pre-formed condition if the forming pressure were released, since there is a certain amount of internal stress produced by the forming process. Hence, the dies 10 and 11 cannot be opened until the sheet 20 has been set, which setting is accomplished either by cooling, or when using certain materials the setting is accomplished by further heating. In any event, the sheet 20 must be set in its altered form to retain the perfection of the surface of the planos and their parallelly positioned faces.

By this arrangement it may be seen that I provide a method for simultaneously producing a plurality of flat optical planos, and for simultaneously finishing the opposite surfaces of the planos to a surface finish of optical perfection.

While the form and embodiment of the present invention discloses and describes a specific form of apparatus, yet I do not desire to be limited by the specific showing or description, various mechanical arrangements being available to practice the teachings of my invention, all of which come within the purview of the claims.

It is also to be understood that the reverse system for forming planos can be used. That is, I can position a plurality of individual blanks between parallel plane surfaces and accomplish the same result as by the apparatus specifically described. Here, also, the planos will be simultaneously produced, and the material moved by compression of the masses can expand laterally into the free areas between the blanks.

Having thus fully described my invention, what I claim as new and desire to secure by Letters Patent is:

1. A method for simultaneously producing a plurality of optical planos which consists, of positioning a sheet of resinous material between surfaces having a plurality of spaced projecting plano producing spot surfacing areas of high optical perfection, of elevating the temperature of the sheet of resinous material to a forming temperature, and of compressing the sheet between the plurality of spot surfacing areas to simultaneously move the masses of the material therebetween to surface finish the same and simultaneously therewith relieve the compression pressure within the compression areas by causing the material to flow from between the spot surfacing areas to the spaces between said areas during the entire period of compression upon the areas to prevent crowding the mass moved within the area of the completed planos.

2. A method for simultaneously producing a plurality of optical planos which consists, of positioning a sheet of resinous material between surfaces having a plurality of spaced projecting spot surfacing areas of high optical perfection, of elevating the temperature of the sheet to a forming temperature, of applying pressure upon said surfaces to simultaneously compress a plurality of spot areas of the sheet to surface finish the same and simultaneously therewith relieve the compression pressure within the areas under compression by causing the material to flow from between the spot surfacing areas held under compression into the mass of the material in the sheet that is not under compression to increase the thickness of the uncompressed areas while compressing the spot areas to a thickness that is less than the original thickness of the sheet.

3. A device for simultaneously producing a plurality of optical planos from a sheet of resinous material which consists of, a pair of die carrying members, each of said members having a plurality of optically perfect plano face surfaces elevated from the surface of the member and positioned in spaced relationship to provide a recess area surrounding each of said face surfaces, means to position the die faces on one of the members diametrically opposite the die faces on the other of said members to compress spot areas on the sheet of resinous material positioned therebetween and cause the plastic material to flow laterally therebetween into the areas of the sheet adjacent said areas under compression, said recess area being sufficiently large to continuously receive the flow of plastic from between the opposed die faces as long as forming pressure is applied thereon without confining the same under pressure.

CHARLES V. SMITH.